No. 656,628. Patented Aug. 28, 1900.
G. D. CLARK.
CASTER SUPPORT.
(Application filed May 22, 1900.)
(No Model.)

WITNESSES:
George T. Hackley
E. R. Newell

INVENTOR
George D. Clark.
BY R. C. Mitchell
ATTORNEY

THE NORRIS PETERS CO., PHOTO-LITHO., WASHINGTON, D. C.

UNITED STATES PATENT OFFICE.

GEORGE D. CLARK, OF PLAINVILLE, CONNECTICUT.

CASTER-SUPPORT.

SPECIFICATION forming part of Letters Patent No. 656,628, dated August 28, 1900.

Application filed May 22, 1900. Serial No. 17,531. (No model.)

*To all whom it may concern:*

Be it known that I, GEORGE D. CLARK, a citizen of the United States, residing at Plainville, county of Hartford, State of Connecticut, have invented certain new and useful Improvements in Caster-Supports, of which the following is a full, clear, and exact description.

My invention relates to a caster-support; and my object is to provide a support for a caster which may be made out of a single strip of sheet metal suitably bent into shape, so that it may be inserted in a hollow part, such as a tubular leg of a piece of furniture, to hold the caster in position.

Figure 1:
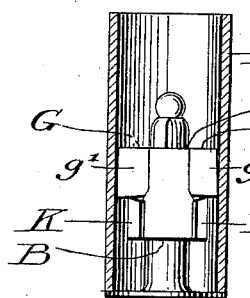
Figure 2:
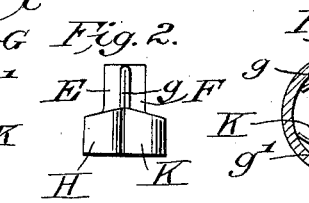
Figure 3:
Figure 7:
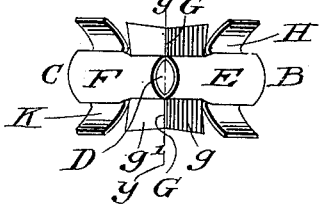
Figure 4:
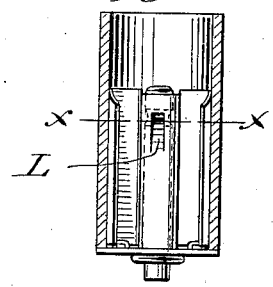
Figure 5:
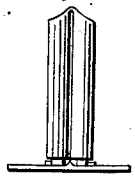
Figure 6:
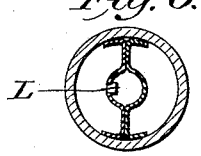
Figure 8:
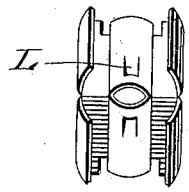

In the preferred embodiment of my invention shown in the drawings, Figure 1 represents a side elevation of one form of my invention; Fig. 2, a side elevation of the support looking at it at right angles to the position shown in Fig. 1. Fig. 3 represents a plan view of Fig. 1. Figs. 4 and 5 are similar views of a modification. Fig. 6 is a sectional view taken on the line X X of Fig. 4. Fig. 7 is a plan view of a blank before it is folded over on itself to form the support shown in Figs. 1, 2, and 3; and Fig. 8 is a blank for forming the support shown in Figs. 4, 5, and 6.

In a caster-support such as described it is desirable that the same be formed as light and at the same time as strong and cheaply as possible and that it be suitably braced, so that it will hold the caster securely in position. By my invention I form a support for the caster which may be either a support for the caster-socket, as shown in Figs. 1, 2, and 3, or a socket for the caster-pintle by folding over a suitable strip of resilient sheet metal and suitably bending the same. By "strip" I do not mean that the metal from which the support is formed must necessarily be longer in one direction than the other.

In the above embodiment shown in Figs. 1, 2, and 3, A is the hollow leg of a piece of furniture. The support, which in this case is a support for the caster-socket, is made from a blank such as shown in Fig. 7. This blank has two portions, represented, broadly, by B and C, which are folded over upon each other along the line $y\ y$. The blank is slitted part way along the line of this fold, as shown at D, and preferably this slit does not extend to either edge of the blank. By "slitted" I do not mean that none of the metal can be removed. Each of these portions B and C is dished in the same direction, as shown at E and F—that is, they are both bent upwardly or downwardly in the same direction, so that when the two portions B and C come together these dished portions will form a tube. These dished portions, each forming a partial (in this case a half) tube, lie on each side of and extend from said slit, and may run from the edge of the strip to the fold or slit, as shown. In case there is a slit or hole at the fold the tube will be open at the upper end, and this is the preferable construction. One or more extensions G G from these dished portions are provided, so that when the portions E F are folded over there will be wings $g\ g'$ extending outwardly from the partial tube and running from said fold downwardly along said dished portion. In the form shown in Fig. 7 there are two of these extensions, one on each side of the dished portions, so that the wings $g\ g'$, which lie against each other, form wings of a double thickness at each side of the tube, as shown also in Figs. 1 and 3. Other productions H K may be provided to form other wings, if desired. When the portions B C are bent over and abut against each other, the dished portions form a single tube open at either end. As shown in Fig. 1, the wings formed by the portions $g\ g'$ and H K when the support is pushed into the furniture-leg spring outwardly and hold the support firmly in place along its entire length, so as to securely hold the caster-socket.

In Figs. 4, 5, and 6 I have made the support form the caster-socket itself, which is provided with wings. The blank from which it is formed is shown in Fig. 8. This embodiment may have a tongue L for engaging underneath the head of the pintle to prevent the withdrawal thereof. Preferably I attach a track-plate to this support for the pintle, as shown.

In the embodiment shown the caster-socket in Figs. 1, 2, and 3 and the pintle of the caster in Figs. 4, 5, and 6 is closely held by the support along substantially the entire length of the tube. The support therefore forms a secure holding means for the caster.

It will be obvious that many changes may be made in the construction herein disclosed without departing from the spirit of my invention.

What I claim is—

1. A caster-support adapted to be inserted in a hollow leg, said support being shaped from a single strip of sheet metal folded over upon itself, said folded-over portions being dished in the same direction so that each forms a partial tube running transversely of the fold and a wing or wings projecting outwardly from each partial tube, said folded-over portions abutting against each other so that said dished portions form a single tube for supporting part of a caster with wings extending outwardly therefrom to engage the inside of the hollow leg.

2. A caster-support adapted to be inserted in a hollow leg, said support being shaped from a single strip of sheet metal folded over upon itself, said folded-over portions being dished in the same direction from edge to fold so that each forms a partial tube running transversely of the fold, and a wing or wings projecting outwardly from each partial tube to engage the inside of a hollow leg.

3. A caster-support adapted to be inserted in a hollow leg, said support being shaped from a single strip of sheet metal folded over upon itself, said folded-over portions being dished in the same direction so that each forms a half-tube running transversely of the fold and a wing or wings projecting outwardly from each half-tube, said folded-over portions abutting against each other so that said dished portions form a single tube for supporting part of a caster with wings extending outwardly therefrom to engage the inside of a hollow leg.

4. A caster-support adapted to be inserted in a hollow leg, said support being shaped from a single strip of sheet metal folded over upon itself and slitted part way along said fold, said folded-over portions being dished in the same direction from the edges of the strip to the slit in the fold so that each forms a half-tube having integral therewith a wing projecting outwardly from and running longitudinally of each partial tube on the same side, said folded-over portions and wings abutting against each other to form a single tube open at each end for supporting a part of a caster and having a wing of double thickness extending outwardly therefrom to engage the inside of a hollow leg.

5. A caster-support consisting of a single strip of sheet metal folded over upon itself, said strip being slitted part way along said fold but not to either edge of the strip, and said portions being dished in the same direction transversely of said fold on each side of and from said slot so that each forms a partial tube open at either end with a wing extending outwardly therefrom at each side running from said fold downwardly along said dished portion.

Signed at Plainville, Connecticut, this 19th day of May, 1900.

GEORGE D. CLARK.

Witnesses:
J. SANFORD CORBAN,
THERA CLARK.